United States Patent
Nohara et al.

(10) Patent No.: US 7,347,224 B2
(45) Date of Patent: Mar. 25, 2008

(54) SUPPLY AND EXHAUST PIPE

(75) Inventors: Masahiko Nohara, Tokyo (JP); Norio Hiruma, Tokyo (JP)

(73) Assignee: Tosetz Co. Ltd, Tokyo (JP)

( * ) Notice: Subject to any disclaimer, the term of this patent is extended or adjusted under 35 U.S.C. 154(b) by 246 days.

(21) Appl. No.: 11/152,534

(22) Filed: Jun. 14, 2005

(65) Prior Publication Data
US 2008/0007055 A1  Jan. 10, 2008

(30) Foreign Application Priority Data
Nov. 26, 2004  (JP)  ............................. 2004-341791

(51) Int. Cl.
*F16L 35/00*  (2006.01)
(52) U.S. Cl. ...................... 138/109; 138/155; 285/424; 285/332.2; 285/332.3; 277/616
(58) Field of Classification Search ................ 138/109, 138/155; 285/424, 332.2, 332.3, 374; 277/615, 277/616
See application file for complete search history.

(56) References Cited
U.S. PATENT DOCUMENTS 1,554,881 A * 9/1925 Reimann ................. 285/382.4
1,824,499 A * 9/1931 Reichenbecher ............ 285/382
4,050,703 A * 9/1977 Tuvesson et al. ........... 277/615
4,874,191 A * 10/1989 Green ...................... 285/332.3
5,473,815 A * 12/1995 Sonden et al. ......... 29/890.149
5,531,460 A * 7/1996 Stefansson et al. ......... 277/615
6,431,609 B1 * 8/2002 Andersson ................... 285/24

FOREIGN PATENT DOCUMENTS

| JP | 10-26342 | 1/1998 |
|---|---|---|
| JP | 2000-161570 | 6/2000 |
| JP | 3163008 | 2/2001 |

* cited by examiner

Primary Examiner—Patrick F. Brinson
(74) Attorney, Agent, or Firm—McGlew and Tuttle, P.C.

(57) ABSTRACT

In order to provide a supply and exhaust pipe comprising a drop-off prevention mechanism, particularly effective for pipes with a large diameter, to increase bending strength and sealing efficiency, formation of a hemmed section A at an top edge of an insert portion 4 can eliminate the occurrence of buckling and increase bending strength. Furthermore, an O-ring for sealing can improve sealing efficiency and also can make itself follow a deformation of the pipe by forming it into a mushroom shape to establish close contacts to the pipe at two points, namely a neck 8b and a part of the circumference 8c of a cap 8a. Furthermore, a drop-off prevention mechanism of the pipe has a wide sliding piece 12, and an arc 17 with a curvature adapted to the curvature of the pipe is formed on the lower surface of the sliding piece 12, to stabilize its sliding.

8 Claims, 15 Drawing Sheets

SUPPLY AND EXHAUST PIPE

CROSS REFERENCE TO RELATED APPLICATIONS

This application claims the benefit of priority under 35 U.S.C. § 119 of Japan Application 2004-341791 filed Nov. 26, 2004, the entire contents of which are incorporated herein by reference.

BACKGROUND OF THE INVENTION

1. Field of the Invention

The present invention relates to a supply and exhaust pipe for an appliance with burning, or a supply and exhaust pipe for ventilation by taking fresh air into a room and/or emitting air from the room to the outside, the supply and exhaust pipe being used for constructing a duct by adding and connecting regular size pipes at site. More specifically, the present invention relates to a supply and exhaust pipe as mentioned having increased bending strength and sealing efficiency at joints when connecting supply and exhaust pipes, and a drop-off prevention function, particularly effective for pipes with a large diameter.

2. Description of the Related Art

For an appliance with a burner placed indoors, particularly for combustion exhaust, exhaust pipes (funnels) are usually constructed at the work site. In addition to such an exhaust pipe, there are some cases of installing a feed pipe or taking fresh air for combustion into an appliance with burner independently of an exhaust pipe. Alternatively, in some cases, a supply and exhaust pipe with a double structure, designed for exhausting through an inner pipe, while taking fresh air through the outer pipe, may be installed. Furthermore, in some cases, for indoor ventilation, in order to emit the air from the room to the outside and to intake fresh air into the room, supply and exhaust pipes may be constructed at the work site.

In these cases of such supply and exhaust pipes, typically, pipes produced at factories, such as straight pipes, elbow pipes, flexible pipes or the like, may be added and connected at site to construct a duct, the duct may have a number of joints created, since the structure of the joint is in a manner of inserting a pipe into an end of another pipe, the following aspects are required.

1. Bending Strength Shall be Large at Pipe Joints.

When extending a duct by connecting pipes, if external force is applied to the duct, stresses across the duct are concentrated to joints, so that these joints may have a buckling, a large bending, disconnection, or decreased sealing efficiency. In order to improve the stress, the insert amount is set, for example, around 75 mm, in a case of a pipe of SUS316L with a plate thickness of 0.3 mm and with a diameter of 120 mm, in addition, a pipe edge of an insert portion side is tapered inwardly to form a taper section, intending to improve buckling strength. The stress, in this case, indicates 0.2 kg to 0.3 kg as static loading, satisfying JIS safety standards in Japan.

However, when performing an impact test in accordance with the standards in the U.S.A. regarding exhaust duct (pipe), "UL1748 Venting System for Gas Burning Appliances, Categories II, II, and IV", the results cannot satisfy these.

2. Sealing Efficiency Shall be High.

Particularly for pipes emitting combustion exhaust to the outside, emitted from a appliance with burner installed indoors, an increase in sealing efficiency at joints is an object. As well as under the normal conditions but additionally when the pipe itself may be deformed, when an external force is applied to the joints, and a bending occurs on the joints, sealing efficiency is decreased substantially. Consequently a leak of exhaust gas may occur.

The current sealing materials used to stop this trouble instantaneously are cross-sectionally circle shaped O-rings. When using this O-ring, as it is necessary to ensure a sufficient close contact between a pipe and an O-ring, the clearance of the insert portion to the diameter (width) of the O-ring is set small. For this reason, insertion of a pipe requires a large force. The O-ring is applied with a lubricant such as grease to facilitate its insertion. However, this lubricant is not only messy (it gets one's hands dirty), but also greasy and slippery, so that there is a need for frequent wiping out grease from hands and cleaning, etc. resulting in decreased work efficiency. To facilitate insertion of a pipe, another method may be considered to set the clearance not so narrow, however, this results in decreased sealing efficiency, particularly when a bending force is applied.

3. Pulling Strength Shall be High, Particularly on Pipes with a Large Diameter.

Joint portions of supply and exhaust pipes should be inserted easily and should not be easily withdrawn. Because of this, supply and exhaust pipes, particularly those emitting combustion exhaust, are not only just inserted, but also generally have a so-called drop-off prevention mechanism for giving a lock between pipes, to secure an inserted pipe not to be dropped off.

However, some drop-off prevention mechanisms have a structure that once it is locked, it cannot be unlocked later, which is inconvenient, accordingly, there are some provisions of drop-off prevention mechanisms having a configuration such that a locking system can be unlocked by one push.

Japanese Patent Publication No. 3 163008 relates to a supply and exhaust pipe of a regular size, comprising a receptacle for a joint formed on one end, and an outer bead formed on an insert portion formed on the other end. The pipe has a structure that an opening is provided on part of the external circumference of the receptacle, the external side of this opening has a stopper ring externally inserted pivotably over an area crossing the opening. Part of this stopper ring is punched out in "]" (bracket) shape as to face circumferentially, the edge of this "]" shape strip formed by punch is directed inwards to form a pawl. By pivoting the stopper ring from which this pawl is formed towards the edge of the pawl, the edge of the pawl is entered into the bead from the opening on the receptacle to prevent drop off. By pivoting the stopper ring reversely from the previous direction in turn to slide up the edge of the pawl with the edge of the opening, the edge of the pawl is disengaged from the outer bead to unlock the drop-off prevention.

However, in this known example, since the stopper ring has to be attached to the pipe, this lead to a high cost, and since the structure let the pawl of the stopper ring slide in-and-out to the outer bead, engagement force between the pawl and the outer bead is small, so that its pulling strength is small.

Japanese Patent Laid-open Publication No. 2000-161570 relates to a drop-off prevention system for supply and exhaust pipes having large pulling strength and allowing pipes detachable by one push. In this system an opening is formed on the receptacle side, and a lock member forming a lock section and an engagement is slidably provided. After the lock section is engaged to a circumferential trough at the opening by inserting the insert portion into the receptacle, by slightly pulling the insert portion side and by engaging the edge of the engagement of the lock member to the envelope wall, when pulling force is applied to the pipe, a wedge effect can work on the lock section so that the strength against pulling is improved. Furthermore, this configuration allows the connection of pipes to be disconnected simply by slightly pushing the insert portion side, pressing the stopper of the lock member, and pulling the pipe. However, the lock member of this invention has a structure to increase the lock force by a wedge effect. As such, most of the lock member is exposed to the outside of the pipe, and may be deformed by external forces In this way, if the lock member is deformed, operation by use of one's finger tip may become difficult and the lock cannot be disengaged.

Japanese Patent Laid-open Publication No. H10-26342 relates to a connecting system for supply and exhaust pipes having a simple structure with low cost in preventing drop-off and with some unlocking ease. It has a configuration that an outer bead on a receptacle is provided with an unlocking hole, and an insert portion is provided with an inner bead and a stopper pawl. When inserting the insert portion into the receptacle, the edge of the stopper pawl engages the outer bead to prevent drop-off. When withdrawing them, from the unlocking hole, an unlocking pin of the unlocking jig is pushed in, to disengage the stopper pawl. However, in the case of this drop-off prevention mechanism, to unlock the locking system, in each case the use of a separate jig is required. This is inconvenient.

In this connection, regarding the supply and exhaust pipes, the standards of Japan for products having a drop-off prevention mechanism are defined in JIS 52080 8.3 Pulling Strength (for products having a drop-off prevention mechanism), in which when a pulling force of 0.3 kN is applied to the disconnecting direction, the exhaust pipe shall not have deformation, damage, or disconnection at joints.

On the other had, the standards of the U.S.A. are defined in UL 1738 20.2 longitudinal force test, its contents are described in the following. Under the conditions described below, when a pulling force of 100 pounds or more (445 N) is applied, the product shall not be broken, removed, or damaged.

(1) Pulling force is to be applied to joints of the supply and exhaust pipes, and a test is carried out for each diameter of supply and exhaust pipes to be connected.

(2) Force is to be applied to the disconnecting direction.

(3) If the pipes are connected with adhesive or the like, the adhesive shall be dried for 24 hours prior to the test.

(4) Force is to be applied for 5 minutes.

Regarding the patent documents discussed above (Japanese Patent Publication No. 3 163008, Japanese Patent Laid-open Publication No. 2000-161570 and Japanese Patent Laid-open Publication No. H10-26342), as a common disadvantage, these can be used for pipes with a pipe diameter up to about 120 mm, however, in pipes with a larger bore, the engagement width of a pawl is relatively small to the circumference, so that pulling strength becomes smaller, leading to the pipe dropping off easily.

SUMMARY OF THE INVENTION

Objects of the Invention

The present invention is proposed in the consideration of the above discussed, and based on the object to provide a supply and exhaust pipe having a drop-off prevention mechanism, particularly for a large bore supply and exhaust pipe with a pipe diameter of 120 mm or more, to satisfy bending strength, sealing efficiency and pulling strength required in Japan and the U.S.A. as described above.

Means for Solving Problem

In order to increase bending strength for the purpose as described above, according to the invention, a supply and exhaust pipe comprises a receptacle formed at one end of the pipe for connecting another pipe, and an insert portion formed at the other end of the pipe for being inserted into a receptacle of another pipe. The pipe is designed to increase bending strength at an edge of the insert portion, by tapering the edge of the insert portion to form a taper section, and by turning up an edge of this tapered section to form a double edge. Furthermore, a turn-up is formed inside or outside of the pipe, and an edge of this turn-up is spot-welded onto the internal surface or the external surface of the pipe wall, or welded around the entire circumference of the pipe.

Furthermore, in order to improve sealing efficiency as one of the objects, according to the invention, a supply and exhaust pipe comprises a receptacle formed at one end of the pipe for connecting another pipe, and an insert portion formed at the other end of the pipe for being inserted into a receptacle of another pipe and a bead for an O-ring is formed on the internal surface of the receptacle. Into this bead for an O-ring, a modified O-ring is inserted comprising a cap and a neck presenting a cross-sectional mushroom shape and having a solid lubricant layer on its external surface. When inserting the insert portion into a receptacle, this modified O-ring has its neck pushed by the external surface of the insert portion and its cap is inclined within the bead for O-ring to the opposite direction from the insert direction, and contacts closely to the internal surface of the bead for O-ring with its cap. By contacting closely to the external surface of the insert portion with part of the circumference of the cap, the modified O-ring is intended to increase sealing efficiency at the joint when being connected with a design to establish close contact to the external surface of the insert portion at two points, namely the edge of the neck and the cap, and to maintain sealing efficiency with a design to follow a bending when it is formed on the joint.

Furthermore, in order to improve the drop-off prevention function as one of the objects, according to the invention, a supply and exhaust pipe comprises a receptacle formed at one end of the pipe for connecting another pipe, and an insert portion formed at the other end of the pipe for being inserted into a receptacle of another pipe, wherein a square opening is formed on part of the external surface of the receptacle. A cover forming a space inside thereof to accommodate a stopper is mounted outside this opening. Within this cover, a sliding piece is integrated having on the edge side thereof, an engagement in a cross-sectionally U-shape or V-shape as to fall from said opening towards the center of the pipe, and having on the opposite side from said engagement, a finger hook exposed from said cover. When inserting the insert portion into the receptacle until a predetermined position, the sliding piece falls from the opening into a lock bead formed on the external surface of the insert portion to prevent drop-off. When sliding (pushing or pulling) the sliding piece with a finger on the finger hook, the engagement slides up along the edge of the lock bead and the opening, by escaping the engagement from the inside of the lock bead to a space within the cover. The lock is unlocked so as to withdraw the insert portion from the inside of the receptacle. Alternatively, the supply and exhaust pipe is characterized in that an opening has a turn-up section being turned up upwards by 180 degree formed at an edge on the side of the finger hook of the sliding piece. This is for reinforcement and for the improvement of functions. Furthermore, a sliding piece has a concave arc formed transversely along the external circumferential surface of the supply and exhaust pipe, to improve locking strength and to stabilize sliding movement; furthermore, in the middle between the engagement and the finger hook of the sliding piece, a warp of 163 degree±7 degree is formed. Furthermore, an open angle of the engagement formed in a U-shape or V-shape, forms 35 to 45 degree, and the level of the edge of this engagement is set at a level lower than that of a plane of the sliding piece on the engagement side by 0.2 to 0.5 mm plus the thickness. Furthermore, an angle between the engagement and the plane of the sliding piece on the engagement side is set at 90 degree±3 degree, leading to the drop-off prevention mechanism being designed so as to maximize its functions.

Effect of the Invention

According to one aspect of the invention, by turning up the taper section at the edge of the insert portion to make a double structure, buckling strength at the edge is doubled. As a result, a buckling is unlikely to occur and bending strength is increased, so that the requirement in Japan and the U.S.A. can be satisfied, even in a case of pipes with a large diameter.

According another aspect of the invention, the modified O-ring contacts closely to the internal surface of the bead for the O-ring along nearly a half of the whole circumference, while to the insert portion, with the modified O-ring being inclined by force generated from the insertion of the insert portion, the modified O-ring contacts closely to the external surface of the insert portion at two points, namely the rim of the cap and the neck. This is to improve sealing efficiency, so that the requirement in terms of sealing efficiency in Japan and the U.S.A. can be satisfied.

Furthermore, by virtue of forming a solid lubricant layer on the surface of the modified O-ring, sliding becomes smooth. The work of connecting or withdrawing pipes becomes easy, hands do not get dirty, so that workability can be improved.

According to another aspect of the invention, since substantially all part of the sliding piece is enveloped with the cover, external force is not often applied to the sliding piece. Thus, sliding pieces and locks do not often have trouble, and forming the opening widely along the circumference and forming the engagement of the sliding piece also widely corresponding to this, lead to increased locking strength and stabilization of the lock, so that the requirement in terms of pulling strength in Japan and the U.S.A. can be satisfied.

According to another aspect of the invention, since the turn-up section reenforces the edge of the opening and works as fulcrum for a seesaw movement of the slide piece, workability is improved.

According to another aspect of the invention, since the sliding piece is shaped transversely in a concave arc along the external circumferential surface of the supply which is in contact with rear surface of the sliding piece, the engagement slides to the internal bead along to the arc whereby the strength of the lock is increased and the pipe is locked not only stably but also easily.

According to another aspect of the invention, with increasing pulling strength, the pipe is able to be withdrawn without any great deal of resistance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
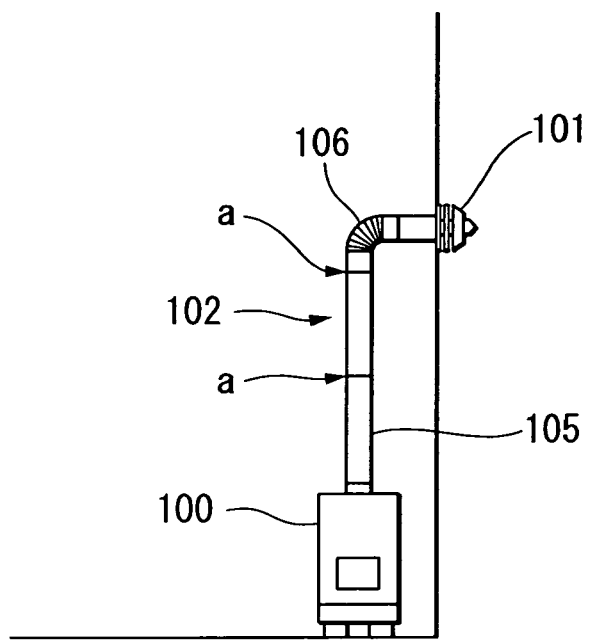
FIG. 1 is an illustrative view showing a appliance with burner and a supply and exhaust pipe(s)
Figure 2:
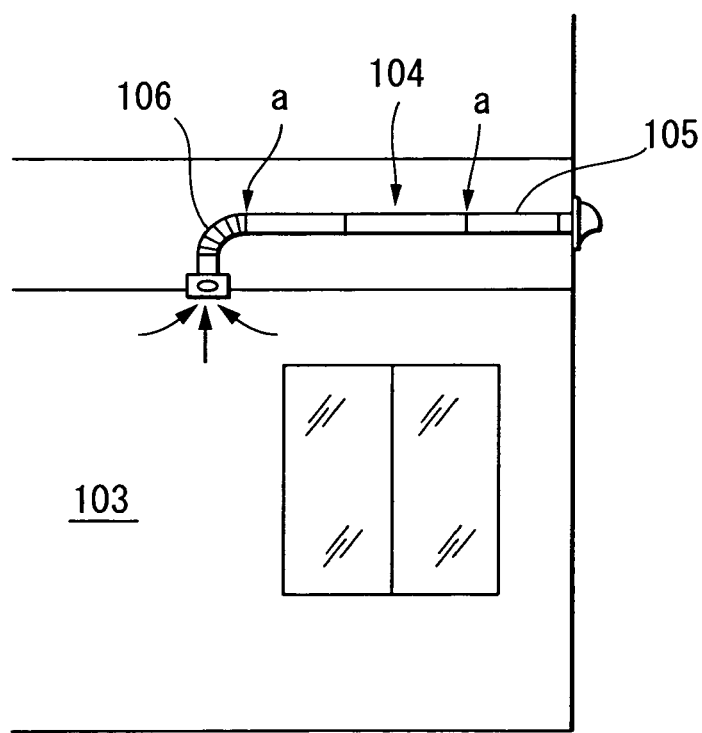
FIG. 2 is an illustrative view showing supply and exhaust pipe(s) for indoor ventilation.

Referring to the drawings in particular, the present invention is applied to supply and exhaust pipes 102 for leading exhaust gas emitted from a appliance with burner 100 to a top 101 placed outdoors as shown in FIG. 1, or to each joint a of supply and exhaust pipes 104 for ventilation in a room 103 as shown in FIG. 2. The exhaust pipes 102 and 104 are constructed using straight pipes 105 and flexible pipes 106, made of metals. In all pipes, a receptacle for another pipe is formed at one end of each pipe, an insert portion is formed at the other end, which is able to insert into a receptacle of another pipe.

The present invention will be explained below in detail based on the drawings of respective examples.

EXAMPLE 1

Figure 3:
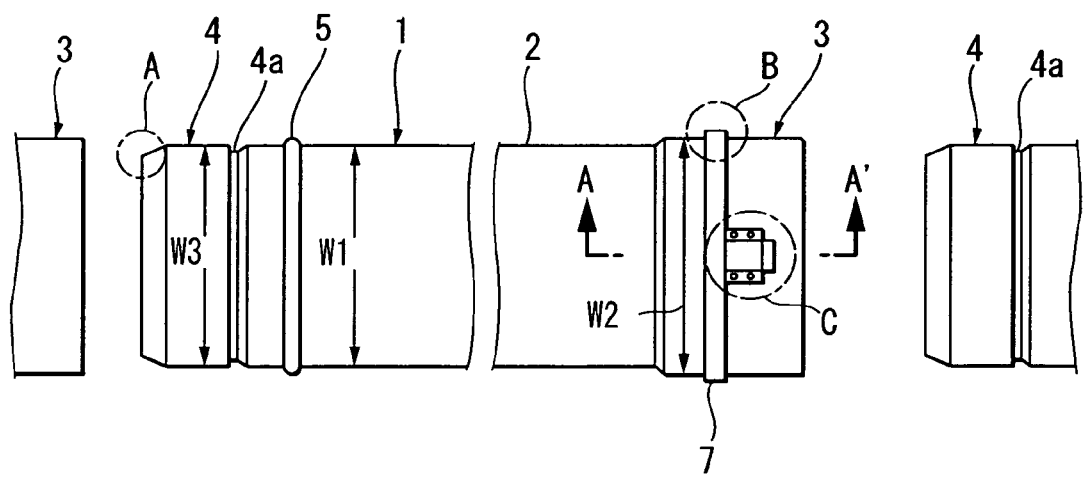
FIG. 3 is an illustrative view showing an appearance of the supply and exhaust pipe(s)
Figure 4:
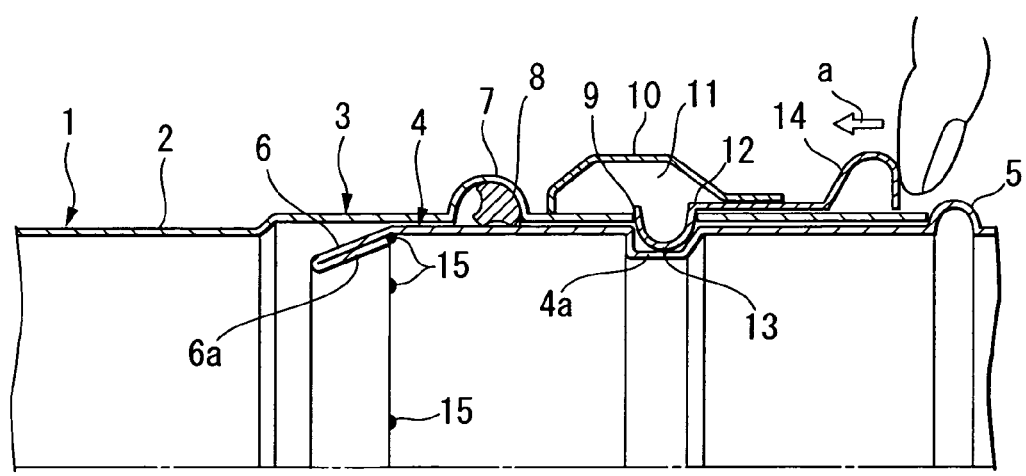
FIG. 4 is an illustrative view showing the cross section along line A-A' in a locked state.

Example 1 shows an overall view of the present invention, and gives an explanation of the schematic configuration according to FIGS. 3 and 4. Reference numeral 1 designates a supply and exhaust pipe serving a straight pipe section of the supply and exhaust pipes, at one end of which a receptacle 3 is formed, having a slightly larger diameter W2 than a diameter W1 of a body 2.

Reference numeral 4 designates an insert portion formed on the opposite side to the receptacle 3 in the straight pipe 1, the insert portion 4 having a diameter W3 equal to the diameter W1 of the body 2, which can be inserted into the receptacle 3.

Reference numeral 4a designates a lock bead (circumferential trough) formed on the circumferential surface of the insert portion 4, the lock bead 4a being engaged by an engagement (as described below) of a sliding piece (as described below) in order to prevent drop-off.

Reference numeral 5 designates an outer bead (circumferential tube swelling) formed on the circumferential surface of the boundary between the body 2 and the insert portion 4, the outer bead 5 serving as a stopper to regulate an inserted amount of the insert portion 4 when inserting into the receptacle 3 of another pipe.

In FIG. 3, A designates a hemmed section formed at an edge of the insert portion 4, the hemmed section A, as shown in FIG. 4, having a double structure with forming a turn-up 6a by inwardly turning up the edge of a taper section 6 formed by tapering an extremity of the insert portion 4. The configuration and function of this hemmed section A will be explained in more detail in Example 2.

In FIG. 3, B designates a sealing system formed at the receptacle 3, the sealing system B, as shown in FIG. 4, comprising an O-ring bead 7 in the semicircular shape, and a modified O-ring 8 in the cross-sectional mushroom shape integrated into the inside of the O-ring bead 7. The configuration and function of this sealing system B will be explained in more detail in Example 3.

In FIG. 3, C designates a drop-off prevention mechanism, the drop-off prevention mechanism C, as shown in FIG. 4, comprising a rectangular opening 9 formed on part of the circumference of the receptacle 3; a cover 10 attached as to cover the outside of this opening 9; a U-shaped engagement 13, placed within an inner space 11 of this cover 10, engaging the lock bead 4a from the opening 9 when an insert portion 4 of another pipe is inserted into the receptacle 3; and a sliding piece 12, exposed from the cover 10, forming a finger hook 14 in the reversed U-shape and being integrated slidably in the direction of the arrow a within the cover 10. The configuration and function of this drop-off prevention mechanism C will be explained in more detail in Example 4.

Each configuration of the straight pipe 1 described above will be used when constructing extensions by adding and connecting pipes at construction site. Furthermore, the configurations will be applied as they are, in principle, also to elbow pipes and flexible pipes.

EXAMPLE 2

Example 2 relates to the invention with a hemmed section A formed at the edge of an insert portion 4 of a straight pipe 1. This hemmed section A has a double structure as the edge of a taper section 6 is inwardly turned up to form a turn-up 6a. It is desirable, in terms of strength, to take the width of this turn-up 6a as large as possible.

Furthermore, the turn-up 6a may be left as turned-up, but also it can increase strength by 5 to 10% by performing spot welding 15 of the edge of the turn-up 6a onto the internal surface of the pipe. Welding may performed around the entire circumference instead of a spot, however, this operation will be time-consuming and result in a high cost, accordingly, spot welding will be sufficient if welding is required.

Three or four points at regular intervals may be enough as points to be spot-welded 15, but also more points may be welded.

The turn-up 6a is to lie inside in the hemmed section A in principle, but it may also lie outside if the conditions.

Figure 5:
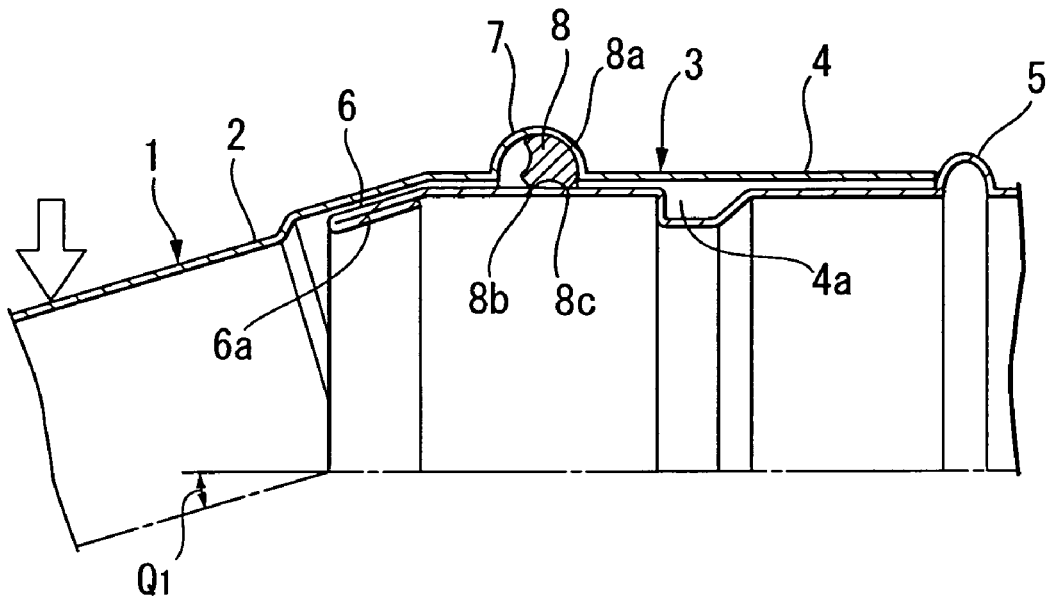
FIG. 5 is an illustrative view showing a joint in a bent state caused by bending force applied onto the pipe joint.

FIG. 5 shows the bending strength when impact tests were performed in accordance with the standard in the U.S.A. in respect to exhaust pipes mentioned above. When a turn-up 6a was formed in a hemmed section A, since strength of the edge of an insert portion 4 was approximately doubled, no buckling occurred in the hemmed section A, and the bending angle $Q_1$ was 30 degree.

Figure 6:
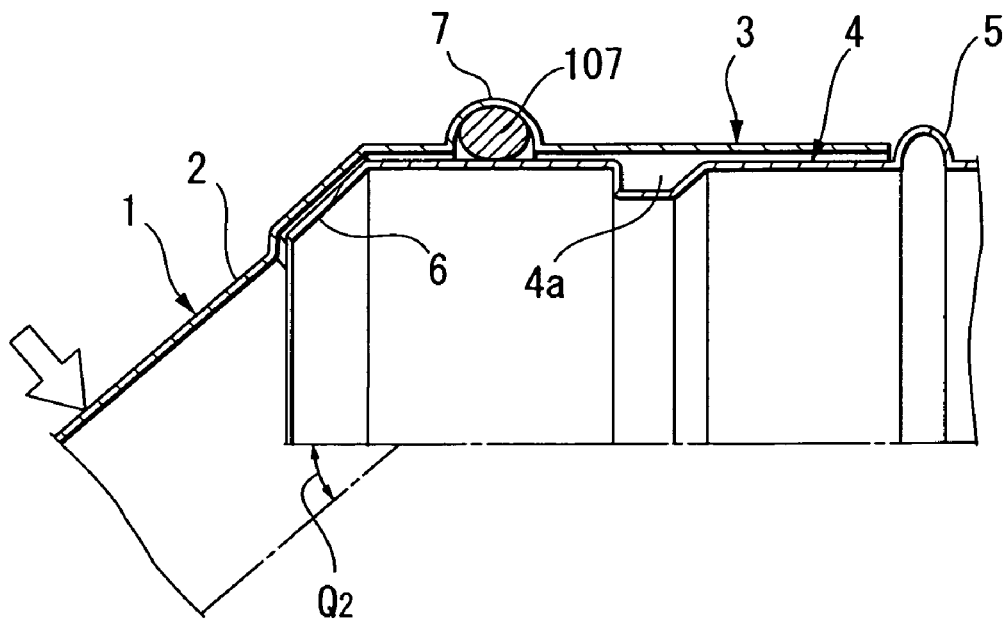
FIG. 6 is an illustrative view showing a comparative example of a conventional pipe with a bend arising on a joint from bending force applied onto the joint.

On the other hand, FIG. 6 shows results of impact tests performed on a conventional product without turn-up 6a, under the same conditions as the tested product according to the present invention. A buckling occurred in the taper section 6 at the edge of the insert portion 4, leading to a very large bending angle $Q_2$ of 47 degree, so that the pipes, including the receptacle 3, were significantly deformed and easily detached, so that particularly the standard in the U.S.A. mentioned above was not satisfied.

EXAMPLE 3

Example 3 corresponds to the invention with a sealing system when inserting an insert portion 4 into a receptacle 3. The configuration and functions will be explained in detail with reference to FIGS. 7 to 11.

Figure 7:
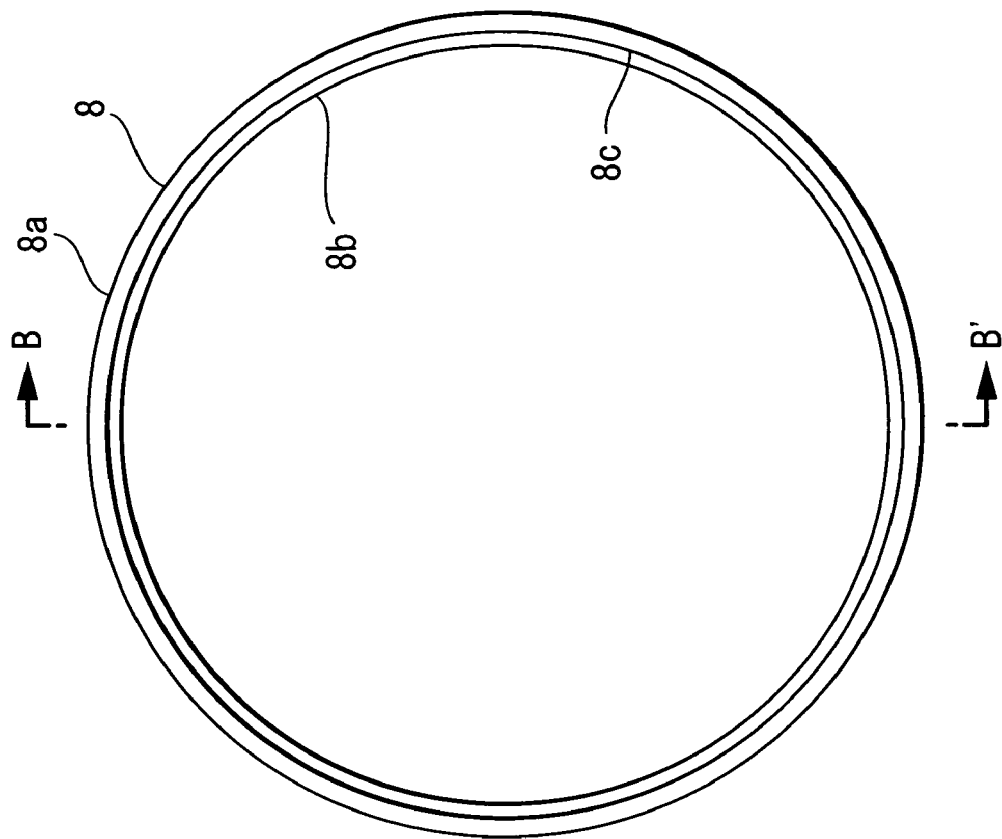
FIG. 7 is a front view showing a modified O-ring according to the present invention.
Figure 8:
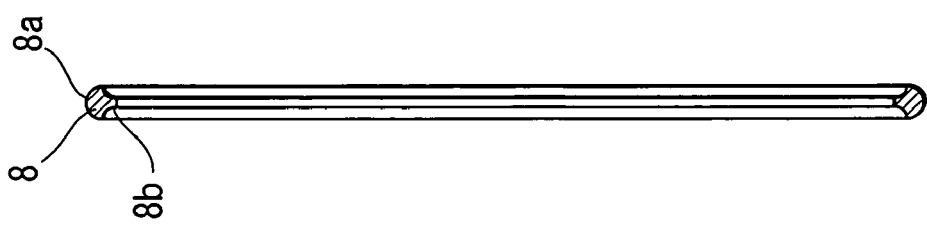
FIG. 8 is a cross sectional view along line B-B'.
Figure 9:
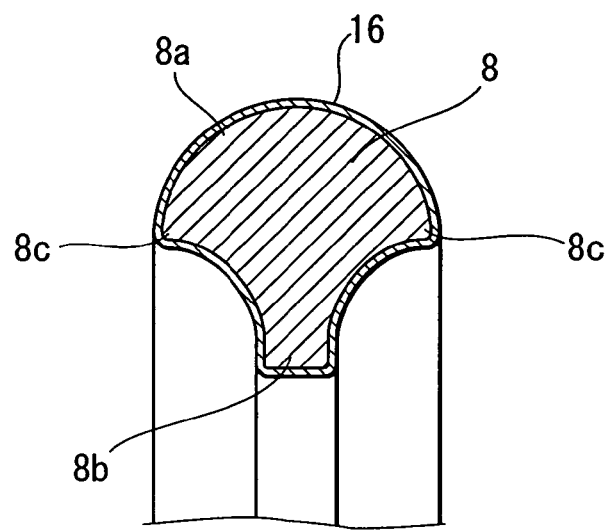
FIG. 9 is an enlarged cross sectional view of a modified O-ring.

FIGS. 7 to 9 shows a modified O-ring 8. This modified O-ring 8 is made from rubber, of which the hardness is equivalent to that of O-rings generally used for supply and exhaust pipes. However, the shape of its cross-section, not a circle, comprises a cap 8a, and a neck 8b facing to the center of the pipe from the central of the cap 8a, presenting a mushroom shape.

Figure 10:
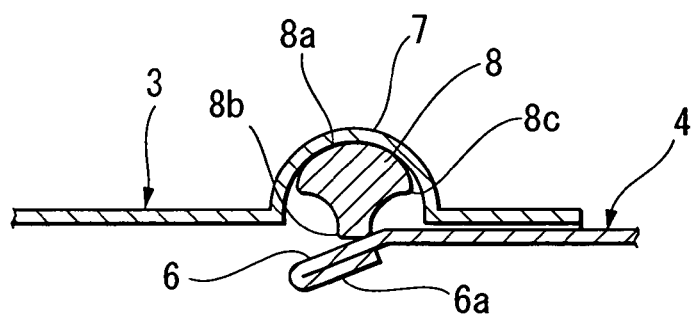
FIG. 10 is an illustrative view showing a modified O-ring integrated within an outer bead.
Figure 11:
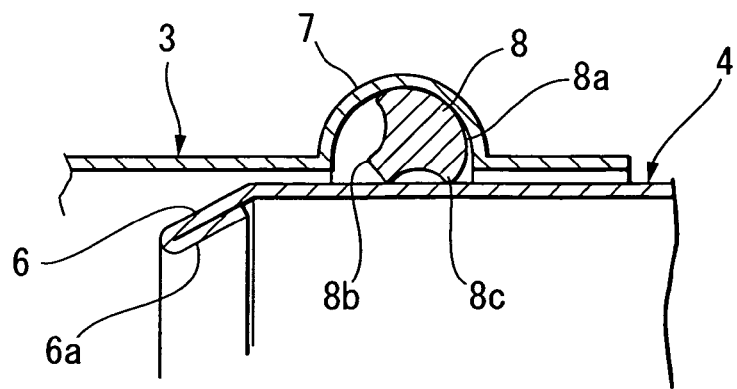
FIG. 11 is an illustrative view showing a modified O-ring in a sealed state having close contact at two positions.

This modified O-ring 8 is integrated within the O-ring bead 7 as shown in FIGS. 4, 10 and 11, the edge of the neck 8b (the internal diameter) is slightly projected from the external diameter of the insert portion 4 towards the center of the pipe.

Consequently, when the insert portion 4 is inserted into the receptacle 3 as shown in FIG. 10, the edge of the neck 8b of the modified O-ring 8 is pushed by the hemmed section A in the direction of insertion, so that it is inclined by approximately 45 degree (torsion) as shown in FIG. 11. As a result, the modified O-ring 8 is, as shown in FIGS. 4 and 11, closely contacted to the internal surface of the O-ring bead 7 with the external surface of the cap 8a on the circumference, while, to the circumference of the insert portion 4, a part of a rim 8c of the cap 8a and the neck 8b provide a close contact at two points.

These two point close contacts increase sealing efficiency, and ensure sealing efficiency because these two point close contacts can follow deformation effectively, even if a bend or deformation occurs in the joints.

Furthermore, the modified O-ring 8 is, when inserting the insert portion 4, facilitated to be inserted, as the neck 8b is pushed in the direction of the insertion and thus inclined to escape from the inserting pressure, as well as the edge of the insert portion 4 is not to be hooked with the neck 8b of the modified O-ring 8. Thus, it is not necessary to be processed for damage prevention to the O-ring by providing R to the edge of the insert portion 4 as conventional manner.

In this connection, the modified O-ring 8 may be used as it is, but preferably, as shown in FIG. 9, it is desirable for the modified O-ring 8 to form a coated layer 16 with solid lubricant over its entire surface in order to reduce sliding friction when connecting the pipes. This is particularly effective for pipes with a large bore. As solid lubricant, "Moly Dry" or "Moly C-S" (SUMICO LUBURICANT CO., LTD.) can be used, but this does not suggest any limitation.

EXAMPLE 4

Example 4 corresponds to the invention with a drop-off prevention mechanism being designed in such a way that, at position C in FIG. 3, when inserting an insert portion 4 into a receptacle 3 until a predetermined position, the insert portion 4 cannot be extracted with the defined force, while it can be easily withdrawn if necessary. This drop-off prevention mechanism will be explained in detail with reference to FIG. 4 and FIGS. 12 to 14.

Figure 12:
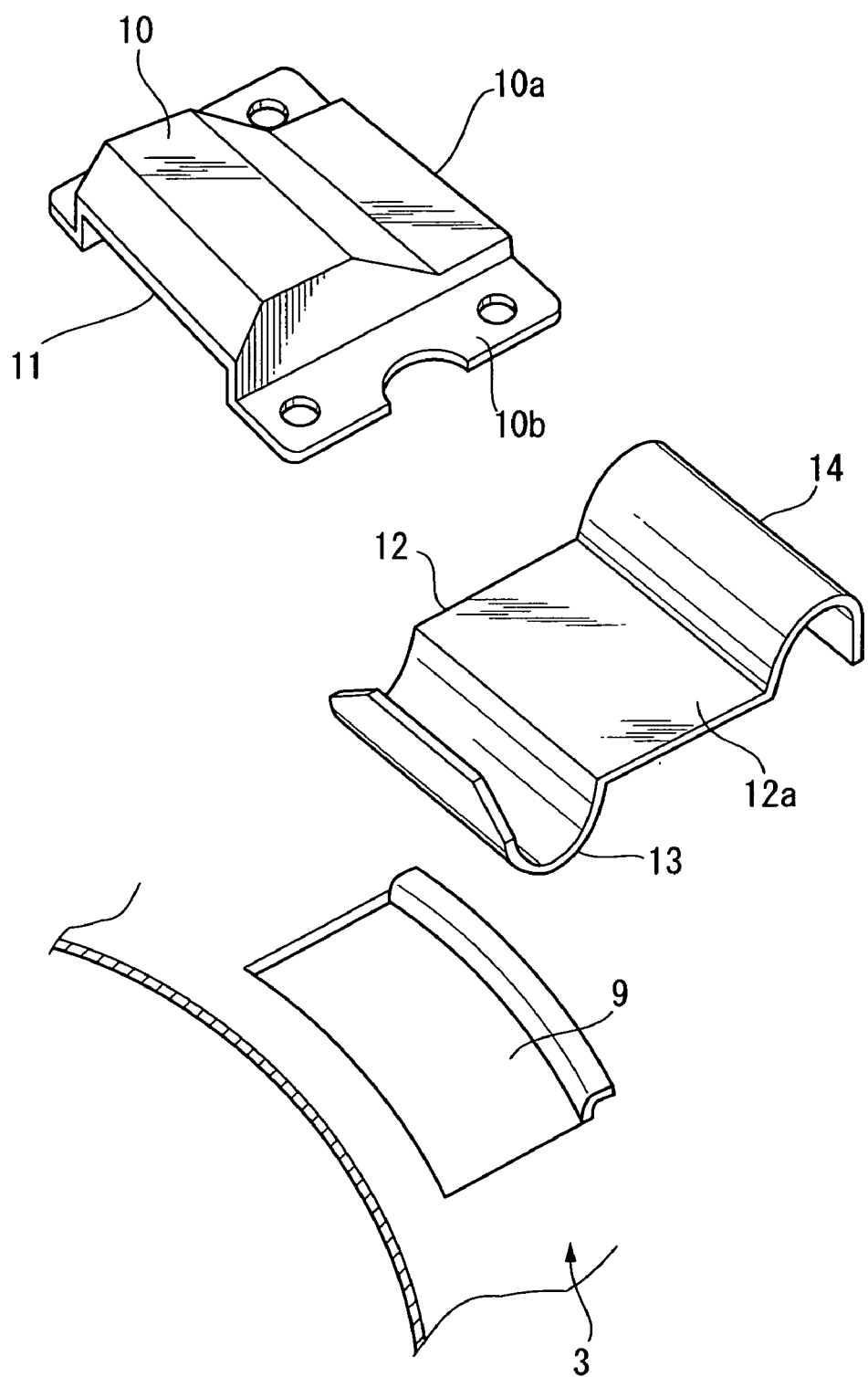
FIG. 12 is an illustrative exploded view showing a drop-off prevention mechanism.

FIG. 12 shows an exploded view of a drop-off prevention mechanism. In FIG. 12, 9 designates a square opening formed on part of the external surface of the receptacle 3 described above. The opening 9 has a large width circumferentially around the pipe, and, at its rear edge, having a turn-up section 9a formed on its upper side to increase bending strength. Reference numeral 10 designates a cover enveloping the opening 9, the cover 10 having the central area formed in a roof shape higher than the other area with a space 11 formed in the inside, and a front area of the cover 10 formed lower than the other area forming an entrance 10a for a sliding piece 12 to slide into, to be weld to the external surface of the receptacle 3 by means of a fixing part 10b.

Reference numeral 12 designates a sliding piece, comprising an U-shaped engagement 13 at the top edge of a plane 12a, and a reversely U-shaped finger hook 14 at the rear edge.

The drop-off prevention mechanism shown in FIG. 12 is, as shown in FIG. 4, mounted to the outside of the receptacle 3; by inserting the edge of the sliding piece 12, facing to the engagement 13, into the cover 10; while exposing the other edge facing to the finger hook 14 forwards from the entrance 10a of the cover 10.

In connection with the drop-off prevention mechanism described above, its functions are explained below.

FIG. 4 shows a locked state. Within the cover 10, the engagement 13 of the sliding piece 12 falls from the opening 9 into the lock bead 4a on the side of the insert portion 4, to establish the locked state, whereby the insert portion 4 cannot be extracted from the receptacle 3 as it is.

Figure 13:
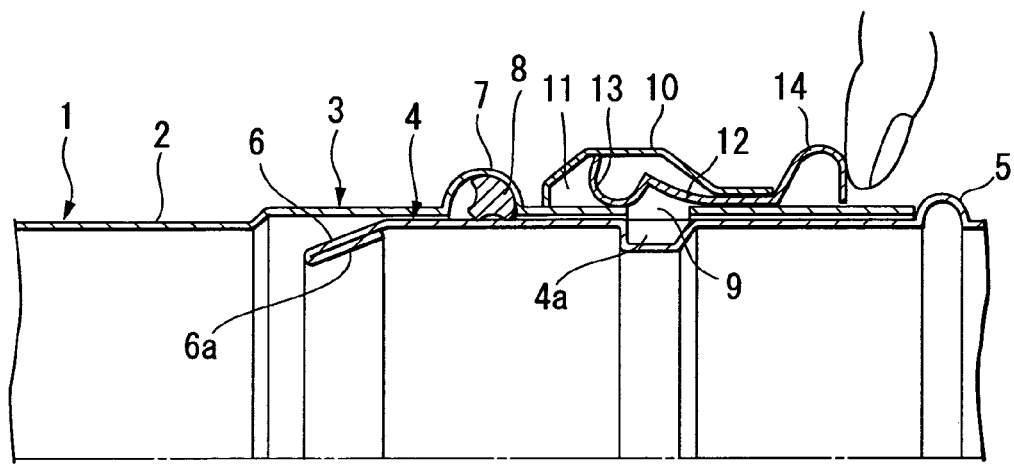
FIG. 13 is an illustrative view showing an unlocked state with a sliding piece being squashed into.

When unlocking this locked state, as shown in FIG. 4, by putting a finger on the finger hook 14 of the sliding piece 12 and pushing the sliding piece 12 into the direction of arrow a, the engagement 13 of the sliding piece 12, as shown in FIG. 13, slides upwards along the lock bead 4a and the rim of the opening 9, escapes into the space 11 in the cover 10, and then completely unlocks from the lock bead 4a.

Figure 14:
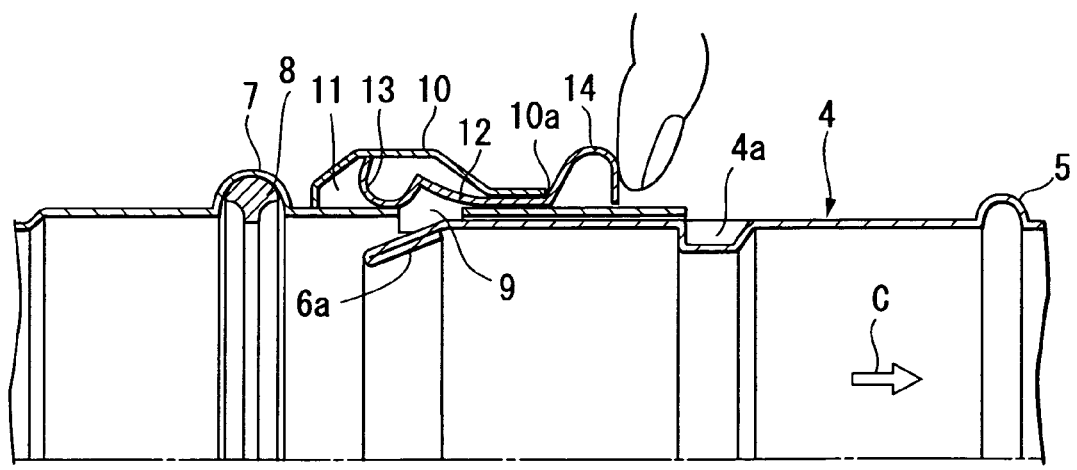
FIG. 14 is an illustrative view showing a state of extracting an insert portion from a receptacle.

In this state, pulling the insert portion 4 side to the direction of arrow c in FIG. 14, the insert portion 4 is easily unlocked from the receptacle 3.

While having explained steps from a locked state to an unlocked state, when setting a lock, the insert portion 4 under the state of FIG. 14 is inserted into the receptacle 3 to become in a predetermined state as shown in FIG. 3, then by withdrawing the finger hook 14 of the sliding piece 12 to the position leading to the state shown in FIG. 4, the engagement 13 falls from the opening 9 into the lock bead 4a with resilience, to establish a locked state. Even when the engagement 13 of the sliding piece 12 falls first into the opening 9, the engagement 13 is pushed up by tapering effect of hemmed section A, resulting in no trouble for the insertion.

EXAMPLE 5

Figure 15:
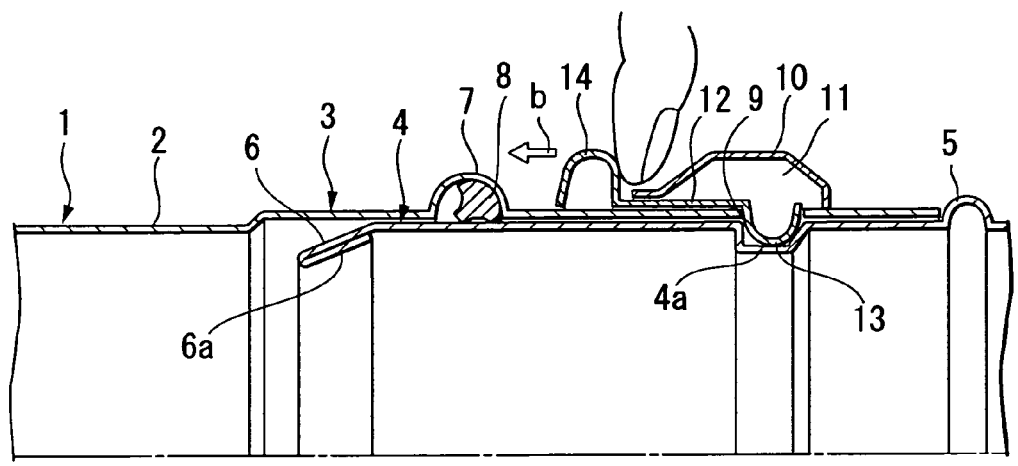
FIG. 15 is an illustrative view showing example 5 for unlocking by withdrawing a sliding piece.
Figure 16:
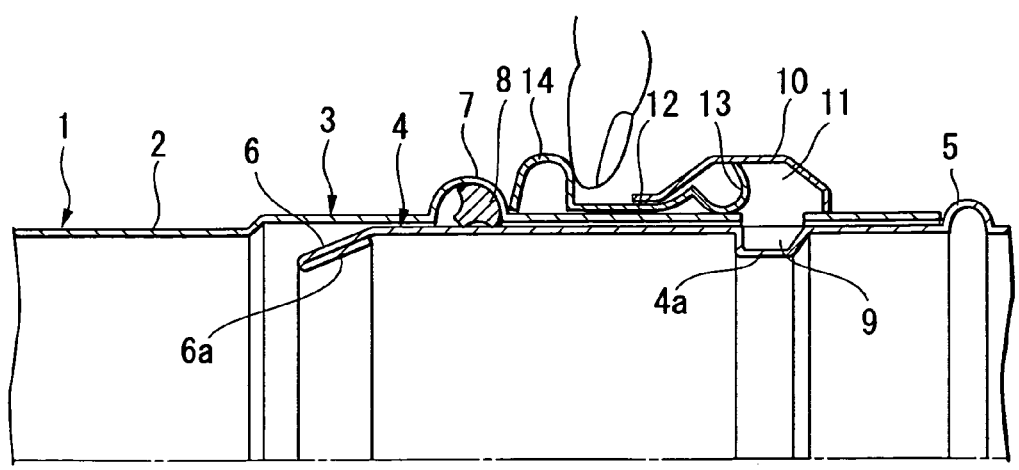
FIG. 16 is an illustrative view showing an unlocked state.
Figure 17:
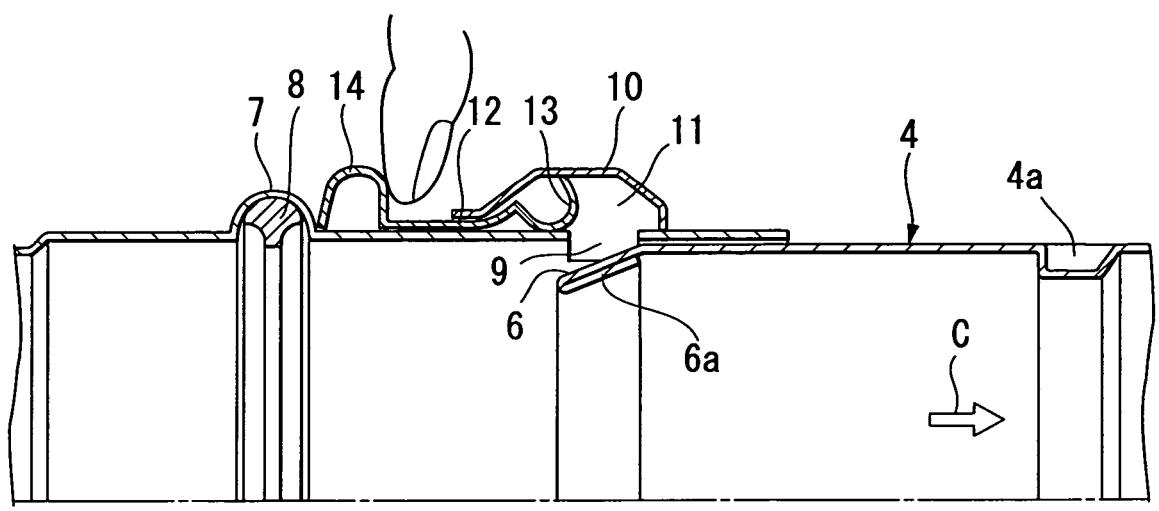
FIG. 17 is an illustrative view showing a state of extracting an insert portion.

Example 5 shows an example of a drop-off prevention mechanism with a sliding piece 12 integrated in the opposite direction from that of the sliding piece 12 in Example 4. While FIG. 16 shows a locked state, pulling the sliding piece 12 to the direction of arrow b in FIG. 15, the lock is to be unlocked as shown in FIG. 16. In this unlocked state, pulling the insert portion 4 side to the direction of arrow c, the insert portion 4 side can be easily withdrawn from the inside of the receptacle 3.

Figure 18:
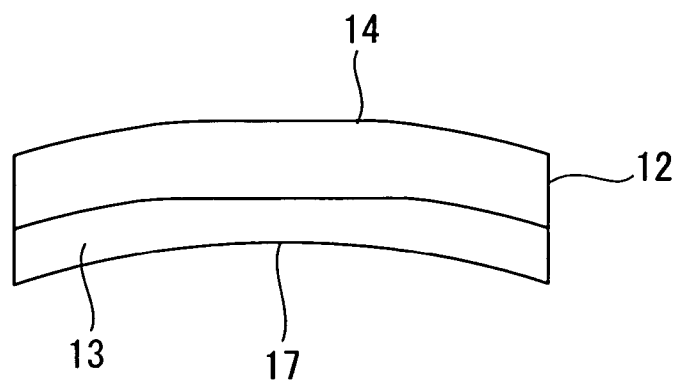
FIG. 18 is an illustrative view showing an example of a sliding piece with its lower surface formed into an arc-shape adapting to the curvature of the pipe.

FIG. 18 shows an example that in the sliding piece 12 a concave arc 17 is formed transversely along the curvature of the external circumferential surface of the receptacle 3 of the pipe, corresponding to claim 8. In this way, leaving the arc 17 in contact with the sliding piece 12, the engagement 13 engages widely along the curvature of the lock bead 4a, so that the engagement strength (locking strength) increases, and the pipe cannot easily be removed even if being deformed.

Furthermore, the arc 17 is adapted to the curvature of the pipe, so that when sliding the sliding piece 12, its movement can be stable to be easily operated. Note that, while adapting the arc 17 to the curvature of the pipe, they do not have to be exactly the same, and some tolerance can be accepted.

EXAMPLE 6

Example 6 corresponds the invention providing a system, in connection with the drop-off prevention mechanism described in example 4, with a further improved function and an easier handling achieved, as the shape of the sliding piece 12 has an inventive design.

A significant difference from the drop-off prevention mechanism of example 4 is the fact that a warp 12a is formed in the middle of the plane 12b of the sliding piece 12, and that the optimal position and angle are achieved in connection with the angle between the plane 12b and the engagement, and the level of the edge of the engagement, and the open-angle of the U-shape or V-shape of the engagement.

Figure 19A:
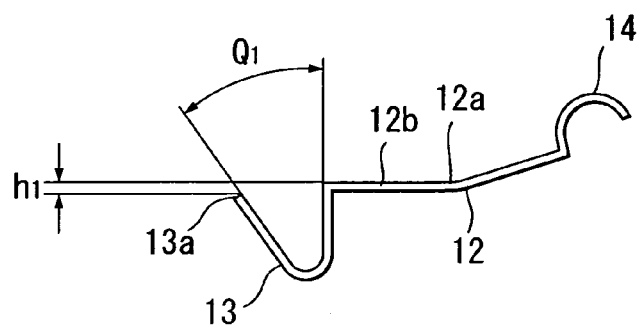
FIGS. 19A and 19B are illustrative views showing a sliding piece with the modified latching part.
Figure 19B:
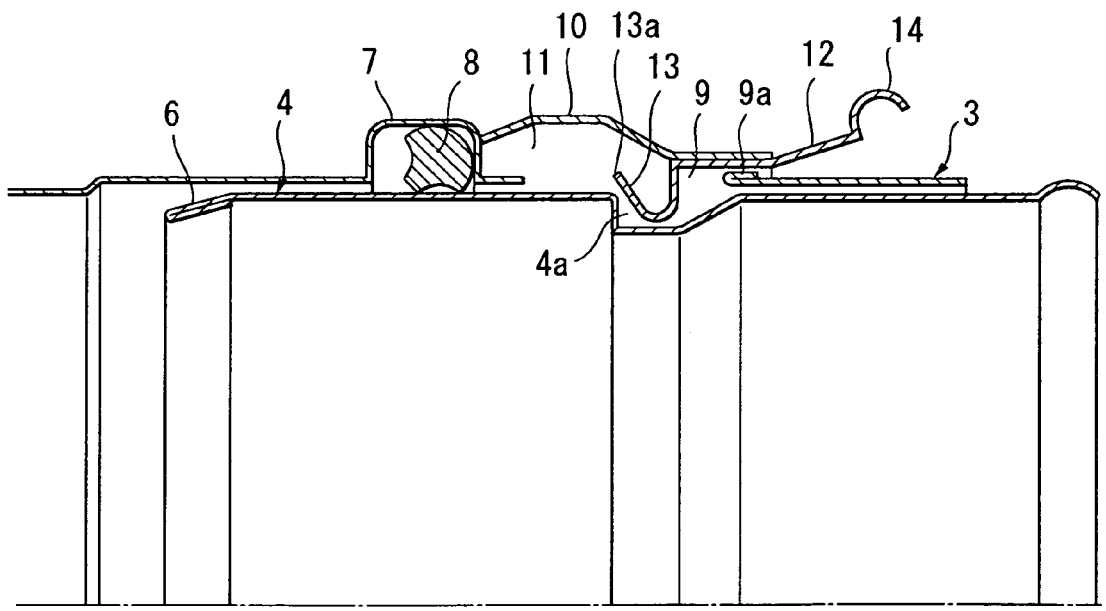
Figure 20A:
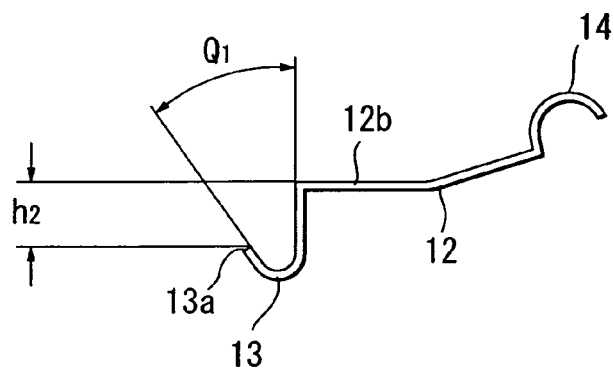
FIGS. 20A and 20B are illustrative views showing a comparative example.
Figure 20B:
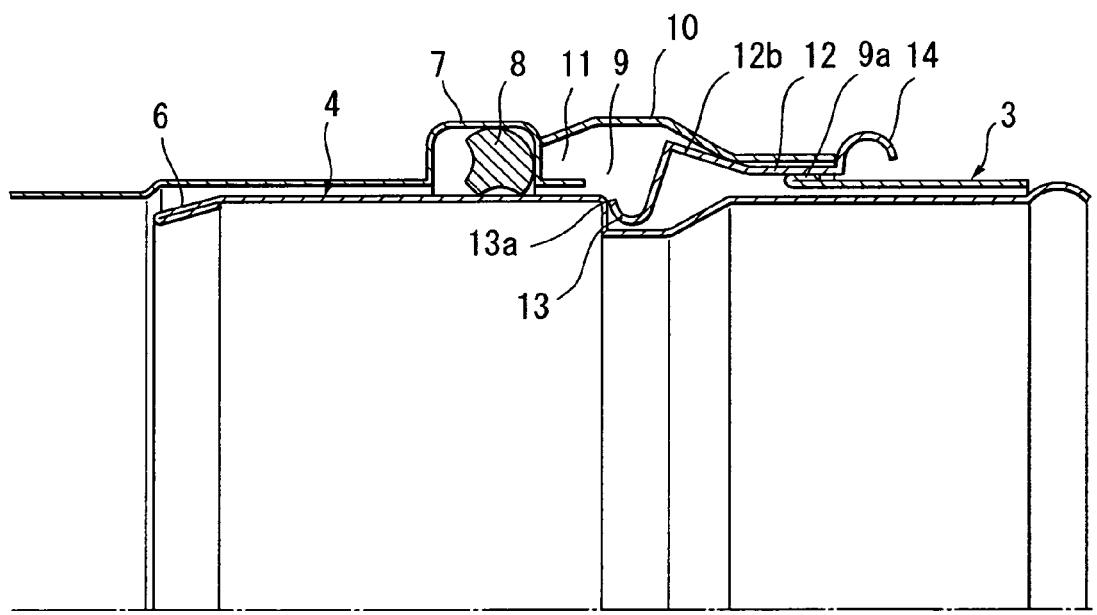

The structure of the sliding piece 12 is specifically explained below. The sliding piece 12 forms an open-angle $Q_1$ of the engagement 13 of the sliding piece 12 into an acute angle (35 to 45 degree) as shown in FIGS. 19A and 19B. Furthermore, it forms a level $h_1$ of a top edge 13a of the engagement 13 into the level lower than the plane 12a by 0.2 mm to 0.5 mm plus the plate thickness when placing the plane 12a horizontally. This dimension is the amount of bite into the lock bead 4a on the insert portion 4 side when pulling the insert portion 4 side. This dimension is very critical, so that the amount of 0.5 mm or more leads to difficulty of removal when trying to disconnecting, while a level $h_2$ of the edge 13a forming an excessively low level leads to a problem to be removed too easily as shown in FIGS. 20A and 20B as a comparative example.

Figure 21A:
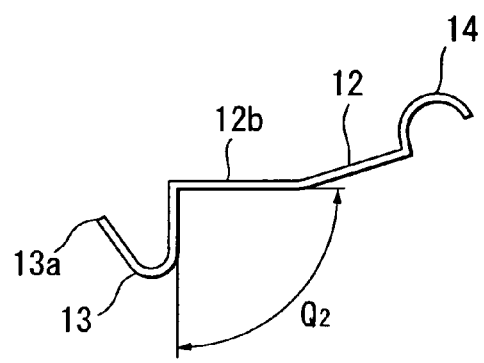
FIGS. 21A and 21B are illustrative views showing a sliding piece with the angle of its latching part being set.
Figure 21B:
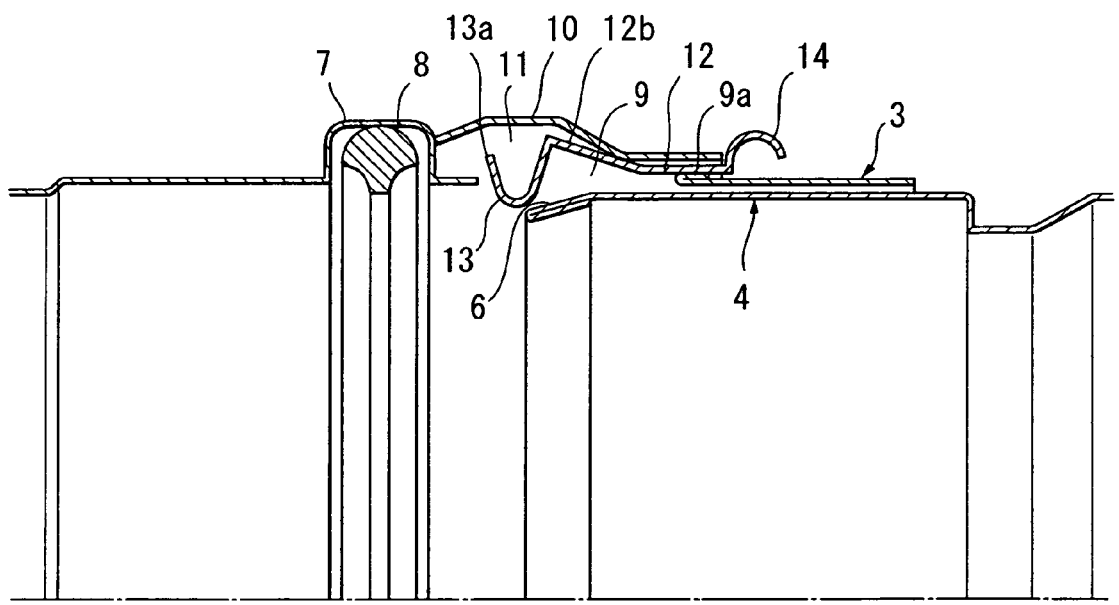
Figure 22A:
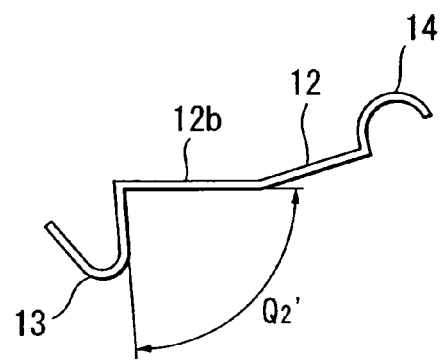
FIGS. 22A and 22B are illustrative views showing a comparative example.
Figure 22B:
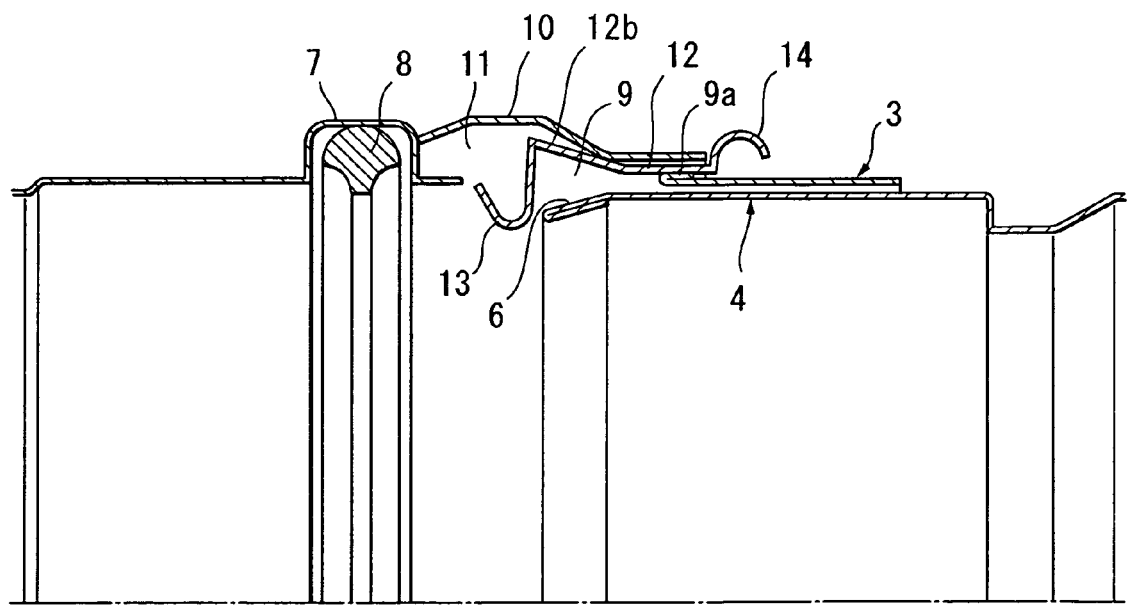

Next, in the sliding piece 12, an angle $Q_2$ of the rear surface forming the plane 12b and the engagement 13 is set at 90 degree±3 degree as shown in FIGS. 21A and 21B. The reason for this is that, as a comparative example shown in FIGS. 22A and 22B, if $Q_2'$ having an acuter angle than 90 degree, when inserting the insert portion 4 into the receptacle 3, the lower surface of the engagement 13 hooks the edge of the insert portion 4 each other, resulting in an unsatisfactory attachment. Furthermore, if $Q_2'$ having an obtuse angle greater than 90 degree, the effect of the sliding piece 12 pushing up the engagement 13 side may cause a damage of the locking system.

Figure 23A:
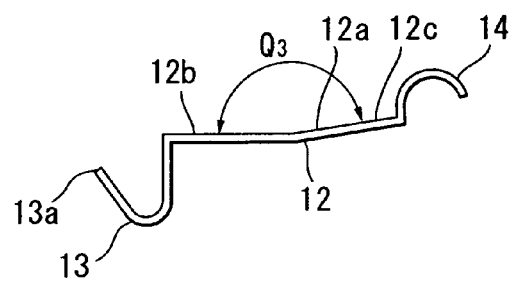
FIGS. 23A and 23B are illustrative views showing a sliding piece forming a warp.
Figure 23B:
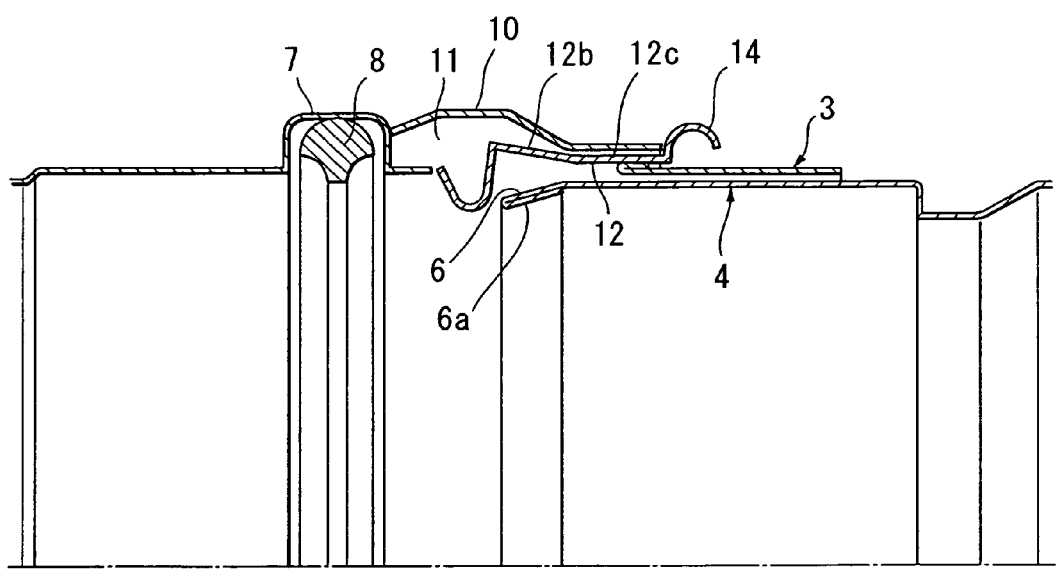
Figure 24A:
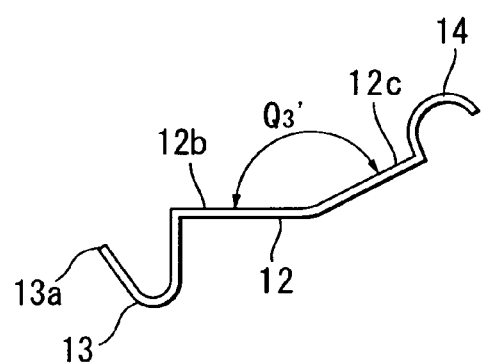
FIGS. 24A and 24B are illustrative views showing a comparative example.
Figure 24B:
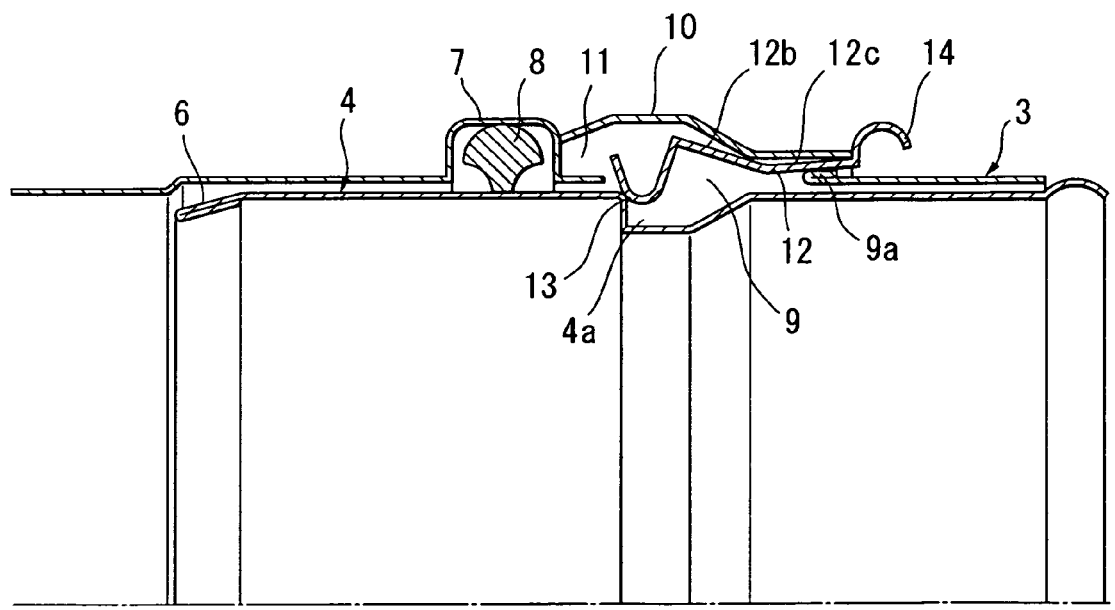

Next, as shown in FIGS. 23A and 23B, on the plane 12b of the sliding piece 12, a central angle $Q_3$ consisting of the plane 12b and a B side surface 12c is warped to 163 degree. However, the degree plus or minus 7 degree can maintain the function. Unless this angle $Q_3$ is warped, when pulling the insert portion 4 side, the engagement 13 is projected towards the lock bead 4a, the resistance of insertion would be increased. Furthermore, as shown in FIGS. 24A and 24B, when the angle $Q_3$ is deep (156 degree or less), the sliding piece 12 could not move smoothly, so that the engagement 13 of the sliding piece 12 could not be attached within the lock bead 4a, leading the lock unfunctional.

Note that, in the sliding piece 12, the dimension of the engagement 13 is, when placing the plane 12b horizontally, ideally 3.7 mm in total, consisting of 0.2 mm of a clearance for the cover 10, 0.6 mm of the plate thickness including the turn-up section 9a, 0.4 mm of the gap between bore of the receptacle 3 and that of the insert portion 4 of the exhaust pipe, and 2.5 mm of the depth of the lock bead 4a, and the dimension plus or minus 0.3 mm can maintain pulling strength within the requirements. When the dimension is less than 3.4 mm, the engagement 13 of the sliding piece 12 enters shallowly into the lock bead 4a, leading the locking system unfunctional. Furthermore, when the dimension is 4 mm or more, the projection of the engagement 13 is greater than the internal bore of the receptacle 3, leading to a greater engagement when inserting the insert portion 4. This means that, even when the locking system is unlocked, it cannot be removed.

Next, the turn-up section formed on the opening 9 will be explained. When a opening 9a having a structure only with a square hole, when using the sliding piece 12, strength at the edge of the opening 9 is weak, whereby a buckling easily being formed there. By contract, according to the present invention, on the opening 9, a turn-up section 9a of about 2 mm is formed outside in the direction where the sliding piece 12 moves. This turn-up section 9a has two purposes, and the first one is to increase strength of the opening 9a. This reinforcement is vital to the present invention, because by reinforcing this part, even if external force is applied, the opening 9 may not be deformed and the drop-off prevention mechanism can be stabilized. The second function is a seesaw structure with vertical movement of the sliding piece 12 having a fulcrum at the turn-up section 9a. When the plane 12b of the sliding piece 12 moves to the turn-up section 9a, as shown in FIG. 19B, the engagement 13 of the sliding piece 12 firmly engages the lock bead 4a on the insert portion 4 side, leading the structure not to be extracted. Furthermore, when the turn-up section 9a moves to B side surface 12c, the engagement 13 of the sliding piece 12 is lifted towards the cover 10 to be stowed, the drop-off prevention mechanism can be easily unlocked.

While specific embodiments of the invention have been shown and described in detail to illustrate the application of the principles of the invention, it will be understood that the invention may be embodied otherwise without departing from such principles.

What is claimed is:

1. A supply and exhaust pipe, comprising:
   a receptacle formed at one end of said pipe for connecting another pipe; and
   an insert portion formed at the other end of said pipe for being inserted into a receptacle of another pipe, wherein a bead for an O-ring is formed on the internal surface of said receptacle;
   a modified O-ring inserted in the bead for O-ring, the modified O-ring comprising a cap and a neck presenting a cross-sectional mushroom shape, during insertion of an insert portion into a receptacle, the modified O-ring has a neck pushed by an external surface of the insert portion and has a cap inclined within the bead for the O-ring to the opposite direction from the insert direction, and the cap contacts closely to the internal surface of the bead for the O-ring, and by contacting closely to the external surface of the insert portion with part of the circumference of the cap, the modified O-ring is intended to increase sealing efficiency at the joint when being connected with a design to establish close contacts to the external surface of the insert portion at two points including an edge of the neck and the cap, and to maintain sealing efficiency with a design to follow a bending when it is formed on the joint.

2. The supply and exhaust pipe in claim 1, wherein the external surface of the modified O-ring has a solid lubricant layer formed thereon.

3. A supply and exhaust pipe, comprising
   a receptacle formed at one end of the pipe for connecting another pipe;
   an insert portion formed at the other end of the pipe for being inserted into a receptacle of another pipe, wherein a square opening is formed on part of the external surface of said receptacle;
   a cover mounted outside the square opening and forming inside a stopper space;
   a stopper accommodated in said stopper space;
   a sliding piece integrated in the cover and having on the edge side thereof, an engagement portion having a cross-sectionally U-shape or V-shape as to move from said opening towards the center of the pipe, and also having on the opposite side from said engagement portion a finger hook exposed from said cover, whereby when inserting the insert portion into said receptacle until a predetermined position, said sliding piece moved from said opening into a lock bead formed on the external surface of the insert portion to prevent drop-off, when pushing the sliding piece with a finger on said finger hook, or when withdrawing the sliding piece, said engagement slides up along the edge of the lock bead and the opening, by escaping of the engagement from the inside of the lock bead to a space within the cover, the lock is unlocked so as to withdraw the insert portion from the inside of the receptacle.

4. The supply and exhaust pipe in claim 3, wherein an opening formed on an insert portion side has a turn-up section being turned up upwards by 180 degree formed at an edge on a side of a finger hook of a sliding piece, intending to reinforce the edge of the opening and to improve the functions of the sliding piece.

5. The supply and exhaust pipe in claim 3, wherein a sliding piece is shaped transversely in a concave arc along the external circumferential surface of a supply and exhaust pipe.

6. The supply and exhaust pipe in claim 3, wherein in the middle between an engagement and a finger hook of the sliding piece, a warp of 163 degrees±7 degrees is formed.

7. The supply and exhaust pipe in claim 6, wherein an open angle of an engagement formed in U-shape or V-shape forms 35 to 45 degree, and the level of an top edge of this engagement is set at a level lower than that of a plane of a sliding piece on the engagement side by 0.2 to 0.5 mm plus the thickness.

8. The supply and exhaust pipe in claim 6, wherein an angle between an engagement and a plane of a sliding piece on the engagement side is set at 90 degrees±3 degrees.

* * * * *